Figure 1:
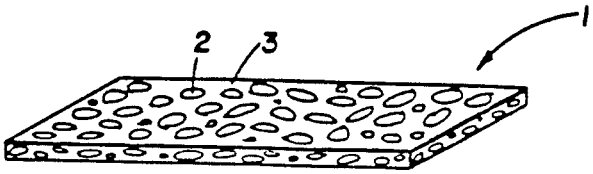
Figure 2:
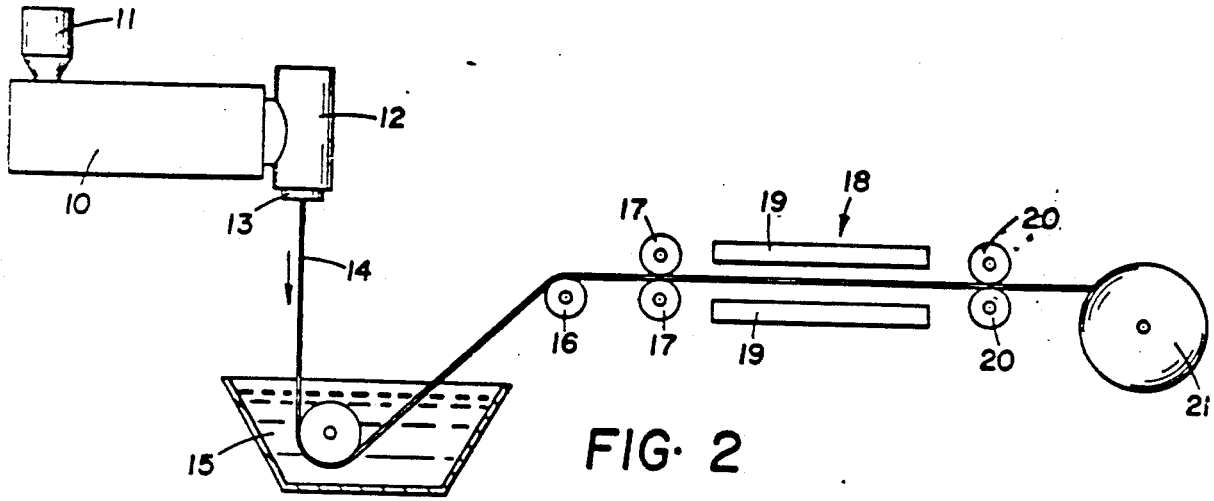

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 669

T856,028

486,325

GLOSSY SATIN-LIKE RIBBON AND METHOD FOR ITS PRODUCTION

Warner D. Long, Kingsport, Tenn., assignor to Eastman Kodak Company, Rochester, N.Y., a corporation of New Jersey

Filed Sept. 10, 1965. Published Nov. 19, 1968
Class 161—168
1 Sheet Drawing. 3 Pages Specification

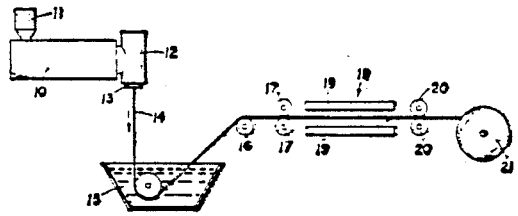

A method of making a polymer ribbon having a unilaterally oriented continuous phase and a discontinuous phase comprising a multitude of small void areas randomly dispersed throughout the ribbon. The ribbon is characterized by a satiny sheen giving it the appearance of a multifilament ribbon. The method includes extruding a mixture of polymer material containing a foaming agent, foaming the material while forming it into a ribbon and stretching the ribbon unilaterally in a ratio of 4:1 to 15:1. Polymers which may be used in the method include polypropylene, polyethylene, polybutene, polystyrene, polyvinyl chloride, polyurethanes, polyesters and polyamides and mixtures of such polymers.

BEST AVAILABLE COPY

WARNER D. LONG
INVENTOR
BY R. Frank Smith
Attorney